July 28, 1931.　　　A. W. ROSEN　　　1,816,700

AUTOMOBILE MIRROR

Filed March 12, 1929

WITNESSES

INVENTOR
A. W. Rosen
BY
ATTORNEY

Patented July 28, 1931

1,816,700

UNITED STATES PATENT OFFICE

ABRAHAM W. ROSEN, OF NEW YORK, N. Y.

AUTOMOBILE MIRROR

Application filed March 12, 1929. Serial No. 346,409.

This invention relates to automobile mirrors.

It is among the objects of the present invention to provide a novel and improved rear-view mirror which may be readily tilted and adjusted to provide the desired angle of reflection.

A further object of the present invention is to provide an improved mirror, the angular adjustment of which may be securely locked against accidental departure therefrom.

Another object of the present invention is to provide a mirror, an improved ball and socket joint whereby the mirror may be adjusted in any desired plane.

Other objects of the present invention include the combination and interrelation of parts, whereby the device provides a novel and improved structure well adapted to meet the demands of economic manufacture.

Further objects and features of the present invention will be apparent from a consideration of the following specification taken in conjunction with the accompanying drawings, in which Figure 1 is a perspective view of one form of my present invention;

Referring more particularly to the drawings, the invention is disclosed in conjunction with a standard 10, having a base 11 which is adapted to be secured to a spare tire through the medium of a clasping member 12. It will be understood that the invention relates to the mirror and standard assembly, and that the standard and the securing means therefor are separately claimed in co-pending applications.

Figure 1:
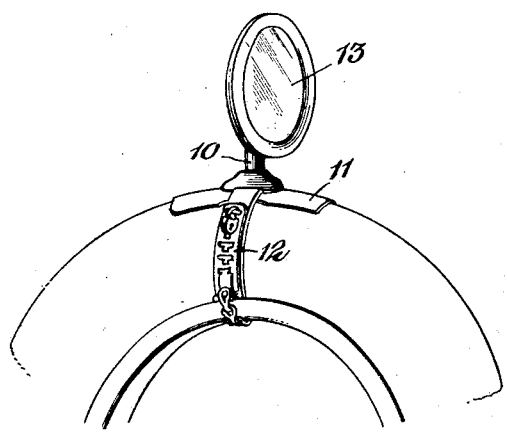
Figure 2:
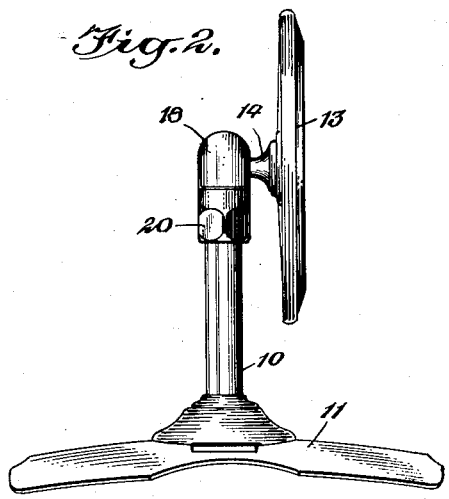
Fig. 2 is a side elevation of that form of the invention shown in Fig. 1.
Figure 3:
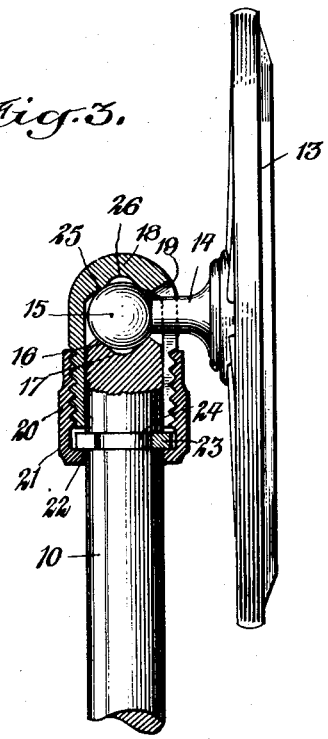
Fig. 3 is a detail view partly in section, illustrating the adjustable connection of the mirror with its support.

Referring specifically to Fig. 3 of the drawings, a mirror 13 is provided, which includes a rearwardly extending supporting arm 14, which terminates in a ball 15. The mirror herein disclosed is shown circular and the supporting arm 14 projects centrally from the rear thereof. It will be understood, however, that the configuration of the mirror may be varied and that the positioning of the member 14 may be altered to provide concentric mounting for the mirror, whereby rotation thereof will adjust the position of the mirror without departing from the spirit or scope of the present invention. The ball 15 of the member 14 is adapted to rest upon a circular recess 16 in the upper end of the standard 10, the recess having a further depression 17 which provides clearance between the standard 10 and the ball 15, thus reducing friction therebetween and providing a lubricating space.

For retaining the ball 15 upon the recess 16, an externally threaded cap 18 is provided, one portion of which is cut out as at 19, whereby association of the cap 18 with the standard 10 permits the cut-out portions to encircle the arm 14. The lower end of the cap 18 is externally threaded as at 20, for engagement with an internally threaded collar 21, the lower end of which is provided with an inwardly extending flange 22, which is adapted to co-operate with a split washer 23, which is removably positioned within a groove 24 in the standard 10. The split washer 23 acts as a bearing ring on the standard. The arrangement of parts is such that when the ball 15 is positioned within the recess 16, the cap 18 is positioned with its opening 19 surrounding the member 14 and engaging the upper face of the ball 15, its lower extremity having threaded engagement with the collar 21. The adjustment of this threaded engagement is arranged to draw the cap 18 toward the washer 23, which is engaged by the flange 22. The inner face of the upper end of the cap 18 is provided with a circular termination face 25, which is depressed as at 26 similar to the depression 17 of the face 16.

In the operation of the device when adjustment of the mirror is desired, the member 21 is unscrewed from the cap 18, thus permitting the cap 18 to be removed from engagement with the ball 15 and permitting the desired adjustment. When the desired adjustment is secured, the member 21 is again screwed, bringing the cap 18 into close engagement with the ball 15, and thus securing the mirror against accidental movement.

It will be understood that by the present construction, the frictional engagement of the ball 15 with the faces 16 and 25, is such that slight adjustments of the mirror may be made against the tension of frictional contact and that the frictional contact will be sufficient to retain the mirror in its adjusted position.

Having thus described the invention, it will be readily seen that it provides a novel, improved, simple and efficient structure which carries out the objects of the present invention in an economical manner. It will be further understood that numerous changes and modifications, and the full use of equivalent in the mechanical structure herein shown may be resorted to without departing from the spirit or scope of the invention as outlined in the appended claims.

What is claimed is:

1. A mounting for vehicle mirrors, including a standard member, ball and socket means connecting said mirror with said standard, said means including an arm extending from said mirror and terminating in a ball, adjustable socket means for co-operation with said ball carried by said arm, said last-mentioned means including a cap member adjustable with respect to said standard, co-operating faces on said cap member and said standard member, and threaded engagement between said standard member and said cap, said engagement being provided by a bushing carried by one of said members and split washer carried by the other of said members.

2. A mounting for vehicle mirrors, including a standard, ball and socket means connecting said mirror with said standard, said means including an arm extending from said mirror and terminating in a ball, adjustable socket means for co-operation with said ball carried by said arm, said last-mentioned means including a cap adjustable with respect to said standard, co-operating faces on said cap and standard, and threaded engagement between said standard and said cap, said engagement being provided by a bushing and split washer, the washer being disposed within a recess in said standard.

3. A mounting for vehicle mirrors, including a standard, ball and socket means connecting said mirror with said standard, said means including an arm extending from said mirror and terminating in a ball, adjustable socket means for co-operation with said ball carried by said arm, said last-mentioned means including a cap adjustable with respect to said standard, co-operating faces on said cap and standard, and threaded engagement between said standard and said cap, said engagement being provided by a bushing and split washer, the washer being disposed within a recess in said standard, and the bushing encircling said standard and engaging said washer.

4. In a mounting for vehicle mirrors, a standard member, an arm member, a mirror supported on the arm member, a ball on the arm member, there being a socket and a ring on the other member, a cap on the last mentioned member having a bearing surface for engaging the ball to hold the ball in the socket and provided with a slotted opening in a side of the cap and extending through the inner end of the cap for accommodating the arm member, the cap having a threaded portion, and a collar having a thread meshing with the thread on the cap and a flange engaging the ring.

5. In a mounting for vehicle mirrors, a standard member, an arm member, a mirror supported on the arm, a ball on one of the members, there being a socket and a groove in the other member, a split ring in the groove, a cap on the last mentioned member having a bearing surface for engaging the ball to hold the ball at the socket and provided with a threaded portion, and a collar having a thread meshing with the thread on the cap and a flange engaging the split ring.

Signed at New York, in the county of New York and State of New York, this 7th day of March, A. D. 1929.

ABRAHAM W. ROSEN.